No. 855,636. PATENTED JUNE 4, 1907.
A. W. HOWELL.
CHART EXHIBITOR.
APPLICATION FILED JAN. 25, 1907.
4 SHEETS—SHEET 1.
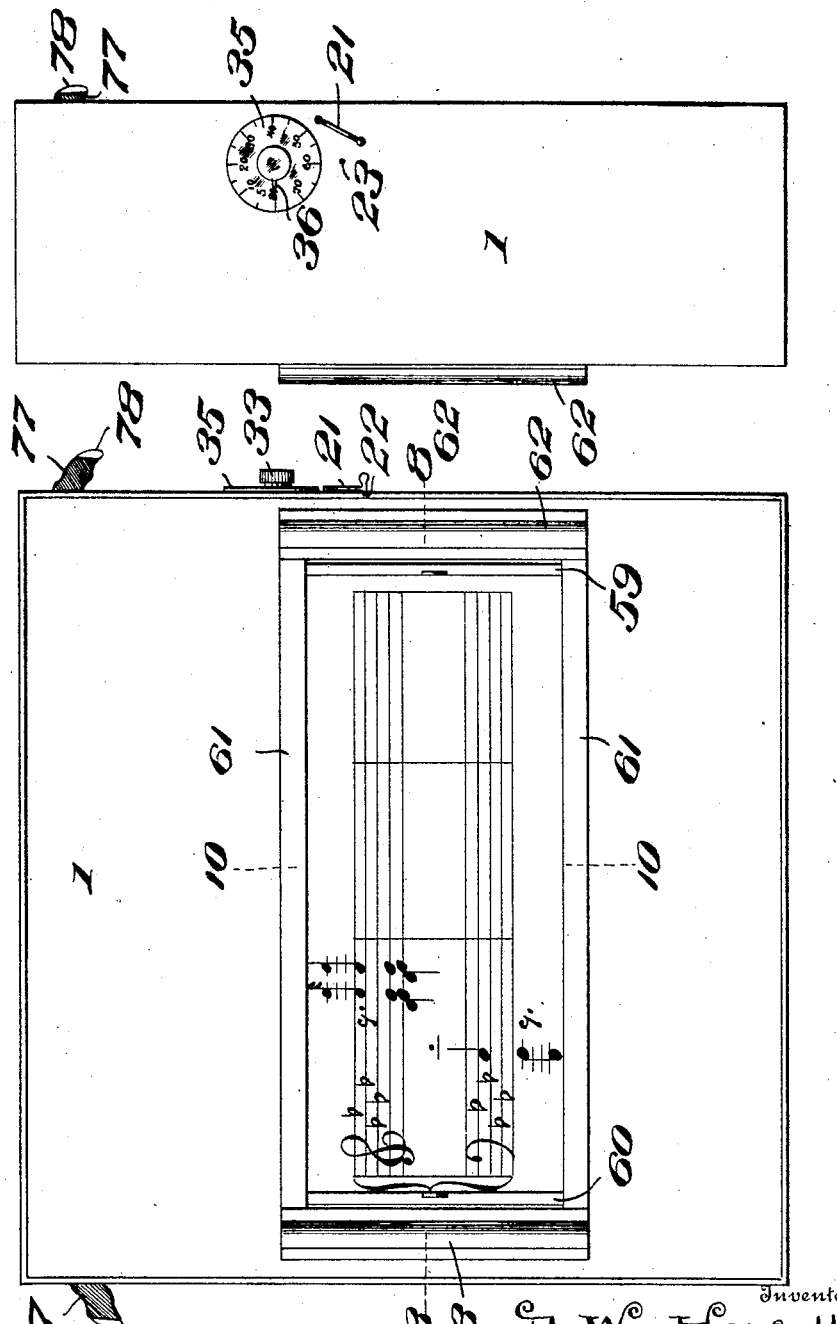

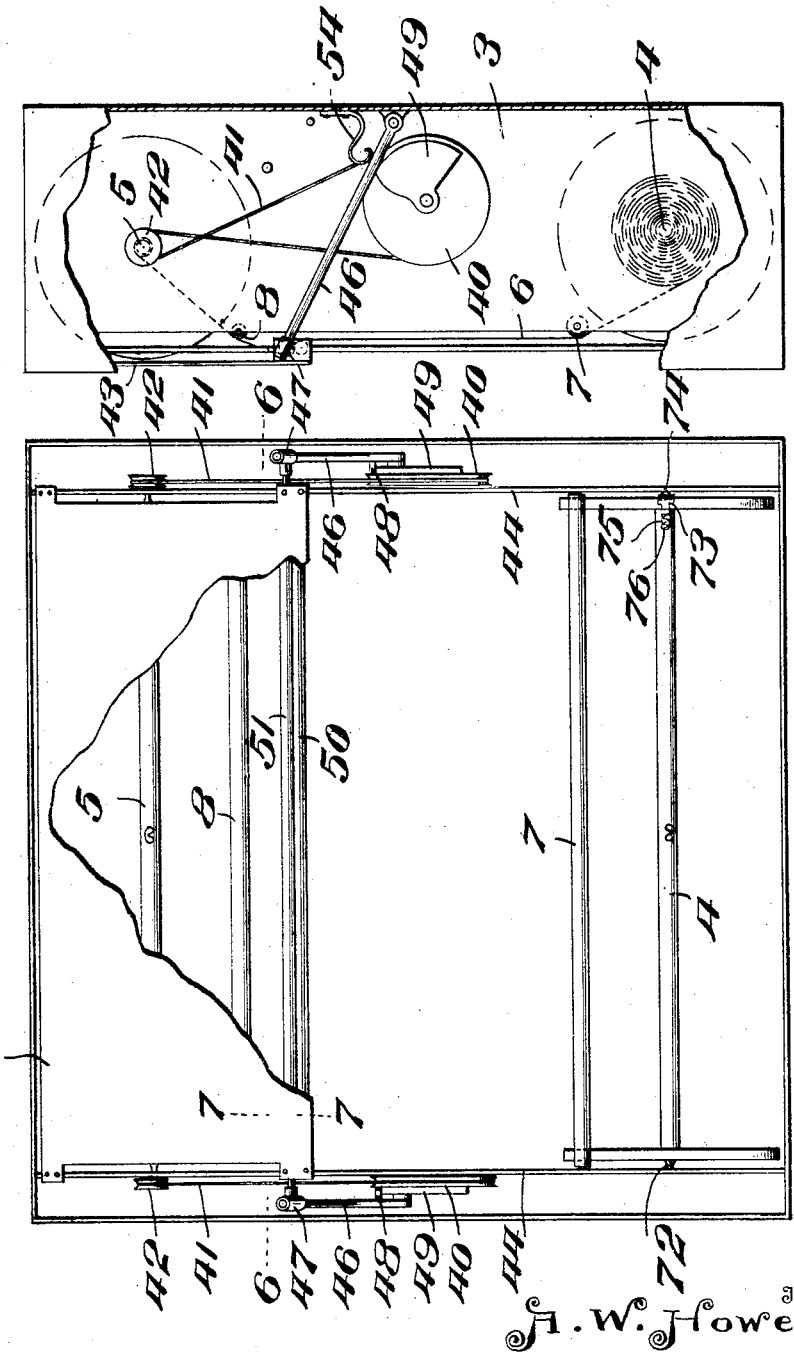

No. 855,636. PATENTED JUNE 4, 1907.
A. W. HOWELL.
CHART EXHIBITOR.
APPLICATION FILED JAN. 25, 1907.

4 SHEETS—SHEET 3.

Witnesses
Thos. W. Riley
L. W. Anderson

Inventor
A. W. Howell
By W. J. FitzGerald & Co.
Attorneys

No. 855,636. PATENTED JUNE 4, 1907.
A. W. HOWELL.
CHART EXHIBITOR.
APPLICATION FILED JAN. 25, 1907.
4 SHEETS—SHEET 4.
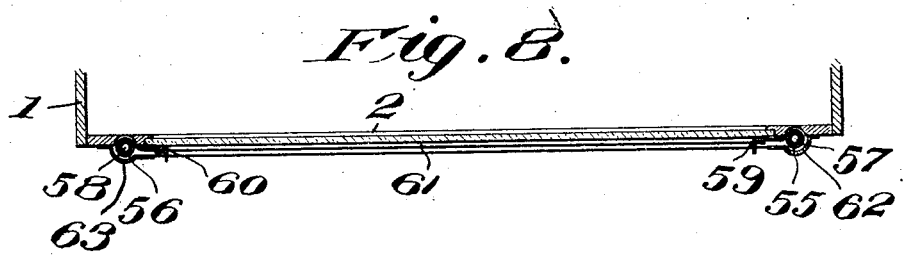
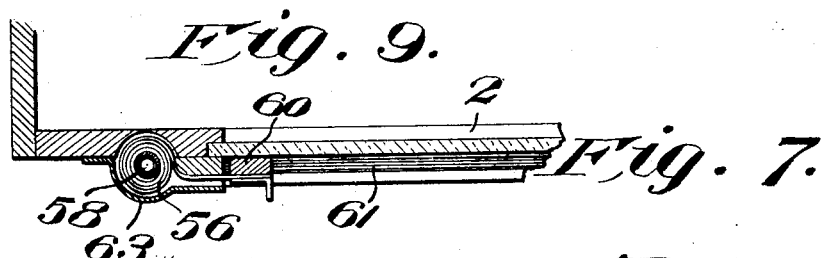
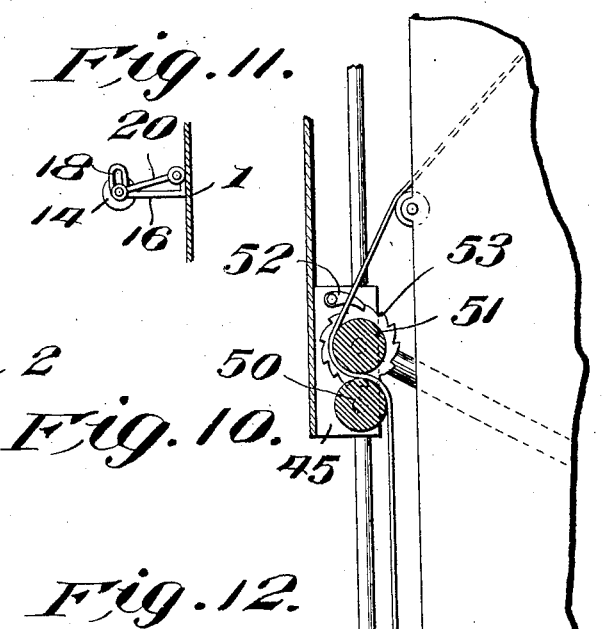
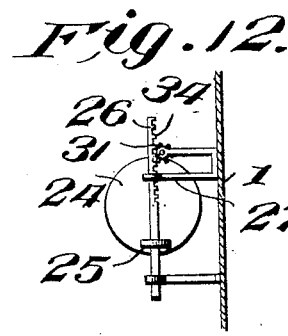
Inventor
A. W. Howell
Witnesses
Thos. W. Riley
L. W. Anderson
By W. J. FitzGerald & Co.
Attorneys

UNITED STATES PATENT OFFICE.

ARLINGTON WARD HOWELL, OF TEXICO, TERRITORY OF NEW MEXICO.

CHART-EXHIBITOR.

No. 855,636.     Specification of Letters Patent.     Patented June 4, 1907.

Application filed January 25, 1907. Serial No. 354,103.

*To all whom it may concern:*

Be it known that I, ARLINGTON WARD HOWELL, a citizen of the United States, residing at Texico, in the county of Roosevelt and Territory of New Mexico, have invented certain new and useful Improvements in Chart-Exhibitors; and I do hereby declare the following to be a full, clear, and exact description of the invention, such as will enable others skilled in the art to which it appertains to make and use the same.

My invention relates to new and useful improvements in chart exhibitors and more particularly to that class adapted to be used in reading or teaching vocal and instrumental music and my object is to provide a strip of material having bars of music printed thereon and employ means for automatically winding said strip from one spool to another and causing the same to travel in front of an opening.

A further object is to provide means for exhibiting one complete bar of music or any portion thereof.

A further object is to regulate the speed of the device whereby the strip will move at different rates of speed across the opening.

A still further object is to provide means for moving the winding mechanism into or out of engagement with the propelling motor.

Other objects and advantages will be hereinafter referred to and more particularly pointed out in the claims.

Figure 5:
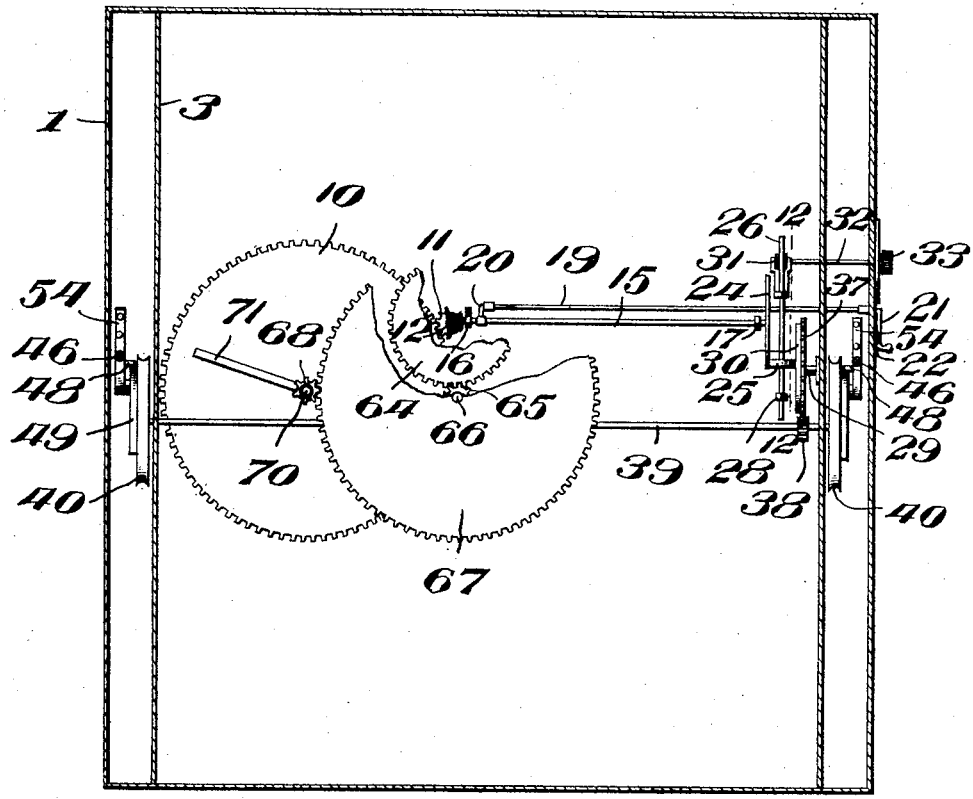
Figure 6:
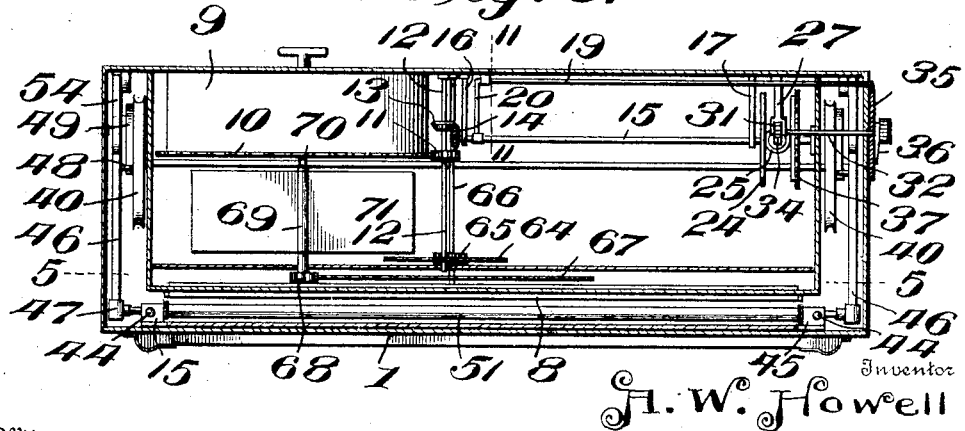

In the accompanying drawings which are made a part of this application, Figure 1 is a front elevation of my improved device complete and showing a bar of the music. Fig. 2 is an end elevation thereof. Fig. 3 an elevation showing the front wall of the casing removed and other parts thereof broken away. Fig. 4 is an end elevation showing portions of the casing broken away. Fig. 5 is a sectional view as seen on line 5—5 Fig. 6. Fig. 6 is a sectional view as seen on line 6—6 Fig. 3. Fig. 7 is a detail sectional view on an enlarged scale as seen on line 7—7 Fig. 3. Fig. 8 is a detail sectional view as seen on line 8—8 Fig. 1. Fig. 9 is a similar view, on an enlarged scale, of one end of the parts shown in Fig. 8. Fig. 10 is a detail sectional view as seen on line 10—10 Fig. 1. Fig. 11 is a detail sectional view on an enlarged scale as seen on line 11—11 Fig. 6, and Fig. 12 is a sectional view as seen on line 12—12 Fig. 5.

Referring to the drawings in which similar reference numerals designate corresponding parts throughout the several views, 1 indicates a housing which is preferably rectangular in cross section and is provided upon one face with an opening or window 2, said window being horizontally disposed and extending substantially the full length of the housing. Mounted in a frame 3 within the housing 1 and at the lower and upper ends of the housing are spools 4 and 5 respectively upon which is adapted to wind a chart 6, and in order to cause the chart to travel immediately in front of the opening 2 the chart is directed over suitable rollers 7 and 8 rotatably mounted in the front edge of the frame 3. Mounted within the housing 1 is a spring motor 9 which is provided at one edge with a gear 10, said gear being adapted to mesh with a pinion 11 carried by a shaft 12, said shaft being rotatably mounted at one end in the frame 3 and at its opposite end to the rear wall of the housing 1. The shaft 12 also carries a bevel-gear 13 which is fixed to the shaft with which is adapted to mesh a bevel-gear 14 carried upon one end of a movable shaft 15, said shaft being in turn carried in brackets 16 and 17 which are secured in any preferred manner to the rear wall of the casing 1.

The bracket 16 is provided at its outer end with a slot 18 through which extends the movable shaft 15 so that said shaft may be elevated to disengage the bevel gear 14 from the gear 13 and thereby stop the winding of the chart upon the spools and to readily accomplish this result a bar 19 is extended into the casing 1 from one end thereof and is rotatably mounted in any preferred manner in the housing, the inner end of said bar having a right angled extension 20 which is adapted to surround the shaft 15, while the opposite end of the bar 19 is provided with a crank portion 21 so that said bar may be readily rotated. The crank 21 is provided on its outer end with a projection 22 which is adapted to engage sockets 23 formed in the end wall of the housing 1, the crank being preferably formed of spring metal so that the same will yield sufficiently to allow the projection to be withdrawn from the socket when it is desired to rotate the bar and said projection will hold the crank in its adjusted position.

In operating the bar 19 to release the bevel gear 14 from the gear 15 the crank 21 is moved to the left from the position shown in Fig. 2 until it engages the opposite sockets 23 this operation causing the right angled exension 20 to elevate the inner end of the shaft 15 sufficiently to disengage the bevel gears 13 and 14.

The opposite end of the shaft 15 from that occupied by the gear 14 is provided with a circular disk 24 with which is adapted to coöperate a friction wheel 25 which is carried by a vertically movable shaft 26 carried in bearings 27 and 28 said bearings being secured to the rear wall of the housing 1.

Secured to the frame 3 is a stub shaft 29 upon which is rotatably mounted a disk 30 said disk engaging the friction wheel 25 at a point diametrically opposite the disk 24, the pivot point of the disk 30 being on a line with the lower edge of the disk 25 so that said disks overlap each other substantially half their width, the object in providing the disks 24 and 30 and the friction wheel 25 being to regulate the speed of the disk 30, and it will be seen that by disposing the friction wheel 25 at the lower edge of the disk 24 and substantially at the central portion of the disk 30 that said disk 30 will be rotated slowly, while by raising the friction wheel 25 the speed of the disk 30 will be increased, and in order to readily raise the friction wheel 25 I have provided a pinion 31 which is rotatably mounted upon a shaft 32, the inner end of said shaft being mounted upon the bearing 27, while the outer end thereof extends through the end wall of the housing 1 and is provided with a head 33 the periphery of which is serrated so that said head can be readily rotated. The pinion 31 is directed into engagement with a rack 34 upon one face of the shaft 26 and it will be seen that when the shaft 32 is rotated that the friction wheel 25 will be moved upwardly or downwardly between the disks 24 and 30, the friction wheel being fixed to the shaft 26 with respect to the longitudinal movement thereof. The outer end of the shaft 32 extends through a graduated plate 35 which is secured to the face of the end wall of the housing 1 and the shaft 32 is provided with an indicator finger 36 so that the operator can readily set the friction wheel 25 to obtain the required speed. Secured to the disk 30 is a gear 37 which meshes with a pinion 38 carried upon a driving shaft 39 said shaft extending longitudinally of the housing 1 and having bearings in the frame 3, the opposite ends of said shaft having grooved pulleys 40 thereon, around which take driving belts 41 which are in turn disposed around grooved pulleys 42 carried by the opposite ends of the spool 5 and by which means said spool is driven, and it will be readily seen that by increasing or decreasing the speed of the disk 30 that the rapidity with which the chart will travel in front of the opening 2 will be accordingly increased or decreased.

It is my desire to cover the opening 2 after the bar of music exhibited therethrough has been played and require the pupil to play the same from memory while the new bar is being brought to view and to this end I have provided a shutter 43 which is slidably mounted upon vertically disposed rods 44, said shutter being secured to the rods by means of blocks 45 one at each corner of the shutter and in order to raise and lower the shutter automatically I pivotally secure to the rear wall of the housing 1 arms 46 there being one arm at each end of the shutter, the outer ends of which are slidably mounted in bearings 47 carried by the lower blocks 45 so that when said arms are raised or lowered the shutter 43 will be correspondingly raised or disposed over the opening 2. Extending inwardly from each of the arms 46 is a pin 48 which extends into the path of a cam 49 carried by each of the pulleys 40 so that when said pins are in engagement with the peripheries of the cams 49 the arms 46 and shutter 43 are elevated. As soon, however, as the pins are released from the cams the shutter 43 will rapidly descend and cover the opening 2 and remain thereover until the pins are again engaged by the cams when the shutter will be rapidly elevated.

The travel of the chart 6 is normally slower than the upward movement of the shutter and in order to cause the chart to travel at the same speed as the shutter 43 on its upward movement the chart is directed between a pair of rollers 50 and 51, said rollers being rotatably mounted between the lower set of blocks 45 and are carried thereby, and when the shutter starts on its downward movement the rollers will freely rotate and allow the chart to freely travel therebetween. As soon, however, as the chart starts on its upward movement the reverse rotation of the rollers is prevented, by means of a dog 52 which is pivotally secured to one of the blocks 45, engages a ratchet 53 at the end of the roller 51 thereby causing the rollers to grip the chart and move the same upwardly with the same rapidity as the travel of the shutter thus enabling the operator to quickly dispose a new bar of music in front of the opening 2 and it will further be seen that by elevating a portion of the chart faster than the spool 5 is rotating that before the spool 5 takes up the slack in the chart caused by the rapid elevation of the shutter the pupil will have time to thoroughly study the new bar of music before the shutter is again disposed over the opening.

In order to positively move the shutter downwardly after the pins 48 have been released from the cam 49 I secure to the rear wall of the housing 1 springs 54 the free ends of which are disposed into engagement with the upper surface of the arms 46 thereby exerting downward pressure against the arms at all times.

If it is desired to expose but a portion of the bar of music to the pupil I have provided curtains 55 and 56 at opposite ends of the opening 2 which are mounted upon the usual form of spring actuated rollers 57 and 58 respectively upon which the curtains are adapted to be wound and the outer ends of the curtains are secured to bars 59 and 60 respectively the upper and lower ends of which are seated in guide ways 61 and if it is desired to cover the latter portion of the bar of music the curtain 55 is moved outwardly the proper distance while if it is desired to cover the first portion of the bar of music the curtain 56 is moved outwardly the required distance thereby providing means for covering either end of the chart desired. The curtains 55 and 56 are preferably placed on the outer surface of the housing 1 and in order to lend a pleasing effect to the housing the curtains 55 and 56 are provided respectively with casings 62 and 63 so that when the curtains are not in use the same will be entirely inclosed by the casings and thereby disposed out of view.

In order to cause the spring motor 9 to unwind at a uniform speed I provide a clock mechanism consisting of a gear 64 which is fixed to the shaft 12 having the pinion 11 and bevel gear 13, said gear in turn meshing with a pinion 65 mounted upon an auxiliary shaft 66 which also carries a gear 67 which in turn engages a pinion 68 on the end of a tubular shaft 69 said tubular shaft being rotatably mounted upon the axle 70 of the spring motor 9 and projecting from opposite sides of the tubular shaft 69 are wings 71 which when rapidly rotated will check the rapid movement of the motor 9 and cause the same to operate with uniformity.

In the beginning the chart 6 is wound upon the spool 4 the free end of which is then directed between the roller 7 and the front of the housing 1, thence between the rollers 50 and 51 over the roller 8 and secured to the spool 5, and after the chart has been used it is rewound upon the spool 4 so that the same may again be used in the manner described.

The roller 4 is removably secured in position in the housing and is provided at one end with a bearing point 72 which is adapted to engage a socket in the frame 3 while the opposite end thereof is provided with an adjustable head 73 which is provided at its central portion with a socket to receive a bearing pin 74 carried by the frame 3, the head 73 being seated in a bore 75 in the spool 4 and yieldingly into engagement with the bearing pin 74 by means of a spring 76 said spring being seated in the bore and against the inner end of the adjustable head so that when it is desired to remove the spool 4 said spool is moved longitudinally until the pivot point 72 is released from its socket.

When the device is in use it is preferably mounted upon a ledge or shelf employed for holding sheet music and is held thereon in any preferred manner as by strips 77 of elastic material to the outer ends of which are secured rings 78 which are designed to engage any suitable projection or button upon the piano.

My main object in providing this device is to cause the pupils to rapidly memorize the music and it will be seen that by exposing a bar of music or any portion thereof a stated length of time and then covering the same and directing the pupil to repeat the notes from memory that this result will be accomplished, should, however, the pupil be slow in memorizing and fail to complete the bar of music before the shutter is lowered the winding of the chart may be stopped by swinging the crank 21 upwardly and thereby disengage the bevel gear 14 from the gear 13 and disengage the spool winding mechanism from the motor. As the memorizing qualities of the pupil increase the speed of the winding mechanism may be likewise increased by raising the friction wheel 25 between the disks 24 and 30, thereby causing the pupil to think rapidly at all times.

What I claim is:—

1. In a device of the class described the combination with a chart having characters thereon and supporting spools for said chart, of means to positively rotate one of said spools and additional means to automatically and intermittently cover the exposed portions of said chart.

2. The combination with a chart, spools for said chart and a motor to operate said spools, of means disposed between the motor and spools to regulate the speed thereof comprising a movable shaft one end of which is operatively secured to the motor, a disk at the opposite end of said shaft, a stub shaft, a disk on said stub shaft, a friction wheel between said disks and engaging the meeting face thereof, means to raise and lower said friction wheel whereby the speed of one of said disks will be increased or decreased, a gear on the second mentioned disk, a pinion meshing with said gear, a driving shaft supporting said pinion, pulleys at the ends of said driving shaft and means interposed between said pulleys and one of the spools whereby said spools will be rotated.

3. The combination with a chart, spools to support said chart, a housing for said spools, and chart, and a motor to drive one of said spools, of means to connect said motor to the driven spool comprising a movable shaft operatively connected at one end to said motor, a disk fixed to the opposite end thereof, a stub shaft carried by the housing, a disk rotatably mounted on said shaft, a friction wheel disposed between said disks and engaging the meeting faces thereof, a shaft extending through said friction wheel, bearings for said shaft, a rack on the upper end of said shaft, a pinion engaging said rack, a shaft for said pinion extending beyond the casing whereby when said shaft is rotated the friction wheel will be raised or lowered to increase or decrease the speed of the disk on said stub shaft, means to indicate the position of said friction wheel between the disks, a gear on the second mentioned disk, a pinion meshing with said gear, a driving shaft supporting said pinion and means interposed between the ends of said shaft and one of said spools to drive the spool.

4. In a device of the class described the combination with a chart, supporting spools for said chart and means to rotate one of said spools whereby the chart will be wound thereon, of means to regulate the speed of said spools comprising a shaft, a disk at one end of said shaft, a stub shaft, a disk on said stub shaft the axis of said disk being below the axis of the first mentioned disk substantially one-half the diameter of the disk, a friction wheel between said disks and in engagement with the meeting faces thereof and means to raise and lower said friction wheel whereby the speed of the second mentioned disk will be increased or decreased.

5. In a device of the class described the combination with a housing having an opening in one face thereof, of a chart within said housing, spools for said chart, a shutter means to operate said shutter to close said opening, rollers carried by said shutter between which said chart passes, means to prevent rotation of said rollers in one direction, arms to support said shutter and means to intermittently engage said arms and raise the shutter whereby the opening in the housing will be uncovered and a portion of the chart elevated.

6. In a device of the class described the combination with a housing having an opening in one face thereof, a chart in said housing and spools for said chart, of a shutter means to operate said shutter to close said opening, means to elevate said shutter comprising arms, bearings on said shutter to telescopically receive one end of said arms the opposite end of said arms being pivotally secured to the housing, a driving shaft for one of said spools, pulleys at each end of said shaft, cams on said pulleys, pins on said arms extending into the path of said cams, means to rotate said cams whereby said cams will be intermittently directed into engagement with the pins and the shutter elevated and means to rotate said shaft.

7. In a device of the class described the combination with a housing having an opening in one face thereof, of a chart having characters thereon, winding spools for said chart whereby the characters will be successively exposed through said opening a shutter longitudinally mounted in said housing and adapted to close said opening and means to intermittently raise said shutter and expose the characters.

In testimony whereof I have signed my name to this specification in the presence of two subscribing witnesses.

ARLINGTON WARD HOWELL.

Witnesses:
P. H. HOWELL,
R. M. RHINE.